United States Patent [19]

Adell

[11] Patent Number: 5,212,468
[45] Date of Patent: May 18, 1993

[54] VEHICLE SIGNALLING SYSTEM

[76] Inventor: Robert Adell, 31800 S. Brandingham, Franklin, Mich. 48025

[21] Appl. No.: 888,516

[22] Filed: May 26, 1992

[51] Int. Cl.⁵ ............................................. B60Q 1/26
[52] U.S. Cl. ................................ 340/469; 340/457.2; 340/470; 340/472; 340/482
[58] Field of Search ............... 340/468, 469, 470, 471, 340/472, 482, 457.2

[56] References Cited

U.S. PATENT DOCUMENTS

| | | | |
|---|---|---|---|
| 2,400,655 | 5/1946 | Saia | 340/470 |
| 2,655,642 | 10/1953 | Ayres et al. | 340/471 |
| 2,878,462 | 3/1959 | Tralli | 340/107 |
| 3,192,437 | 6/1965 | Meyer | 315/77 |
| 3,217,292 | 11/1965 | Henderson | 340/470 |
| 3,517,384 | 6/1970 | Jablonski | 340/83 |
| 3,678,457 | 7/1972 | Lev | 340/107 |
| 3,680,951 | 8/1972 | Jordan et al. | 350/281 |
| 4,037,197 | 7/1977 | Courty | 340/107 |
| 4,443,057 | 4/1984 | Bauer et al. | 350/281 |
| 4,734,697 | 3/1988 | Robinson et al. | 340/469 |
| 4,859,988 | 8/1989 | Holtvluwer | 340/471 |
| 4,989,121 | 1/1991 | Hall | 362/61 |
| 5,113,175 | 5/1992 | Adell | 340/468 |

FOREIGN PATENT DOCUMENTS

| | | |
|---|---|---|
| 3332998 | 3/1985 | Fed. Rep. of Germany ...... 340/468 |
| 3629007 | 3/1988 | Fed. Rep. of Germany ...... 340/468 |

*Primary Examiner*—Jin F. Ng
*Assistant Examiner*—Nina Tong
*Attorney, Agent, or Firm*—Alex Rhodes

[57] ABSTRACT

A vehicle signal system for requesting drivers to dim or turn on their vehicles' headlights comprising a signal light for transmitting a high intensity flashing beam to a driver of an oncoming vehicle, a pair of signal lights for transmitting a pair of alternating flashing beams to a driver of a vehicle behind the signalling vehicle, a control unit for controlling the flashing of the high intensity beams and a driver control for activating and de-activating the front and rear signal lights. One feature of the invention is that the driver control is mounted in a day/night rear view mirror near the eye level of the driver. Another feature is that the front signal light is mounted in the forward end of an outside mirror on the side of the vehicle. The signal system has two selectable operating states. In one operating state, the front and rear signal lights automatically flash for predetermined intervals of time. In the other operating state, the signal lights flash continuously until de-activated by the driver. In an alternate embodiment for vehicles equipped with automatic dimming rear view mirrors, the rear signal lights are automatically activated and de-activated by the mirror's light sensing photocell. In another alternate embodiment, a pair of back-up lamps also function as the rear signal lights.

20 Claims, 9 Drawing Sheets

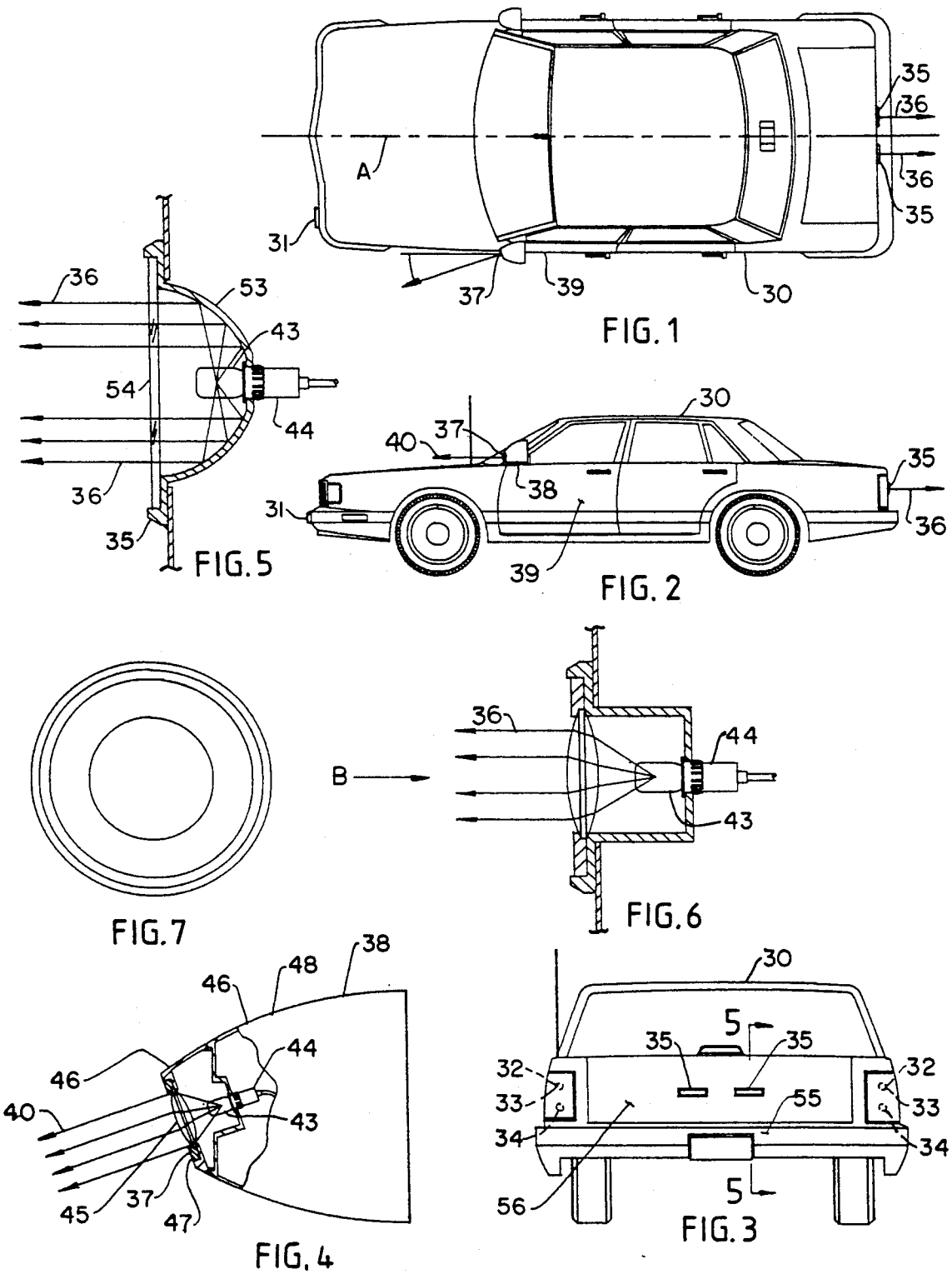

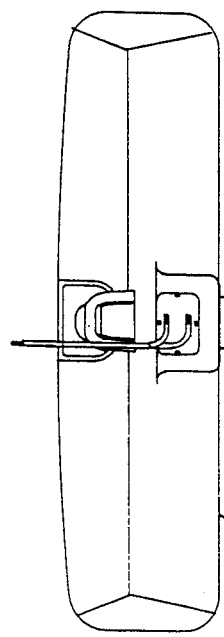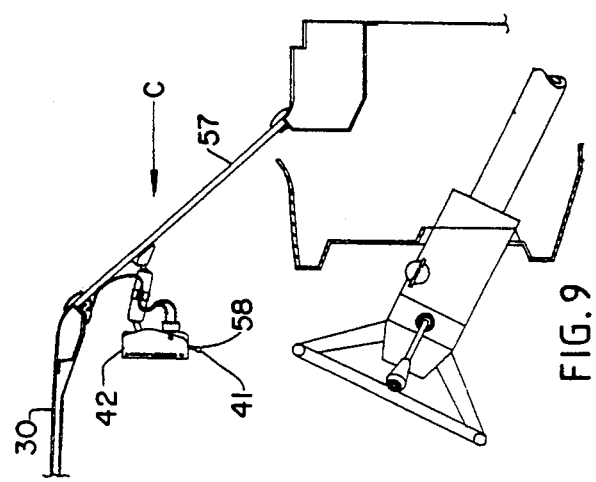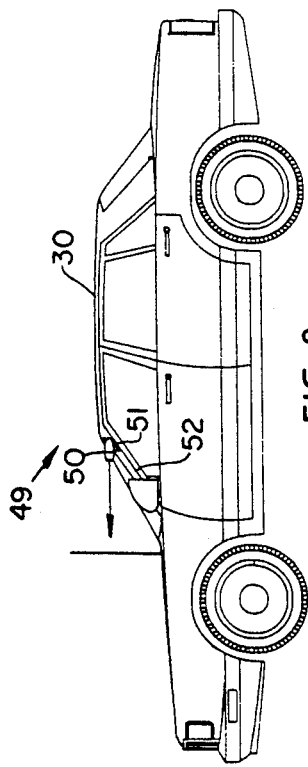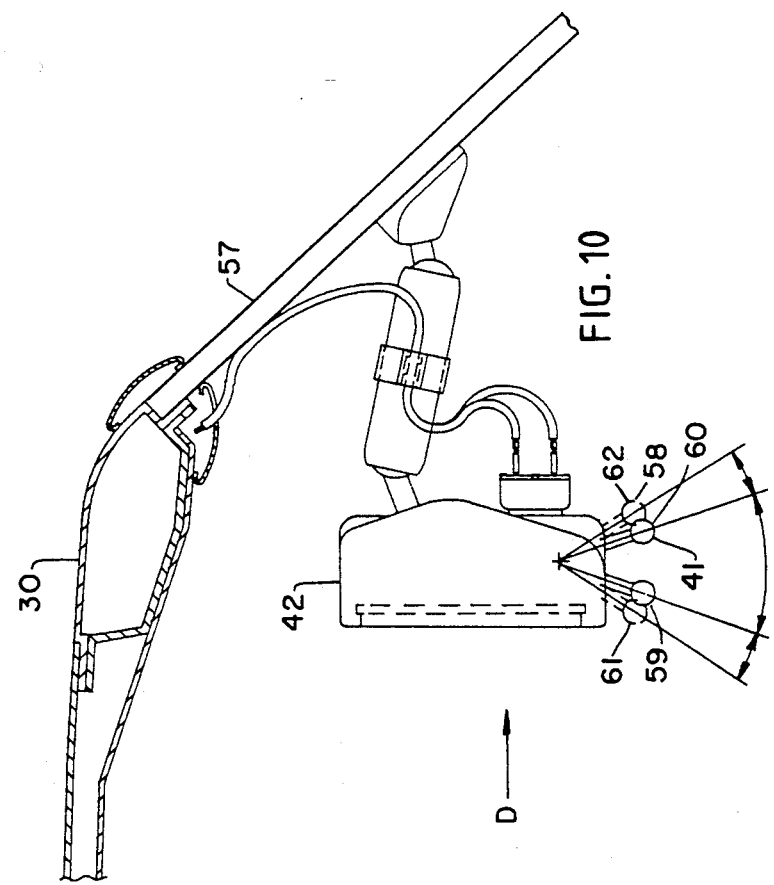

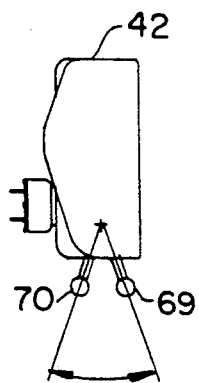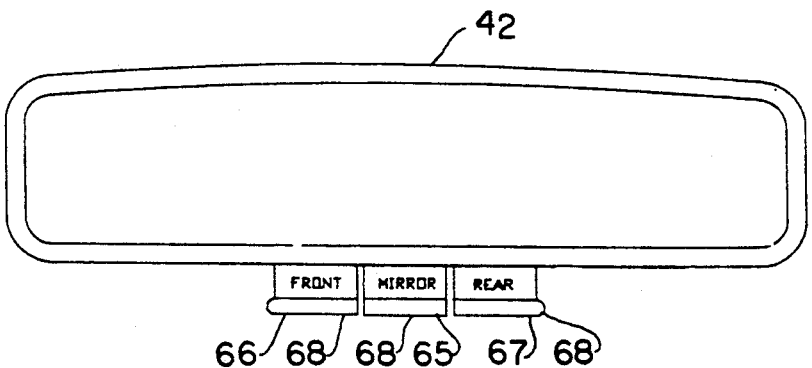
FIG. 14   FIG. 13
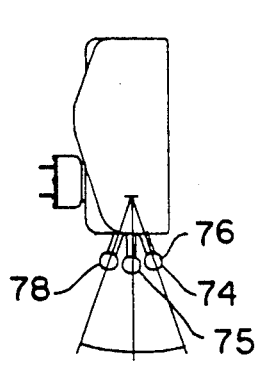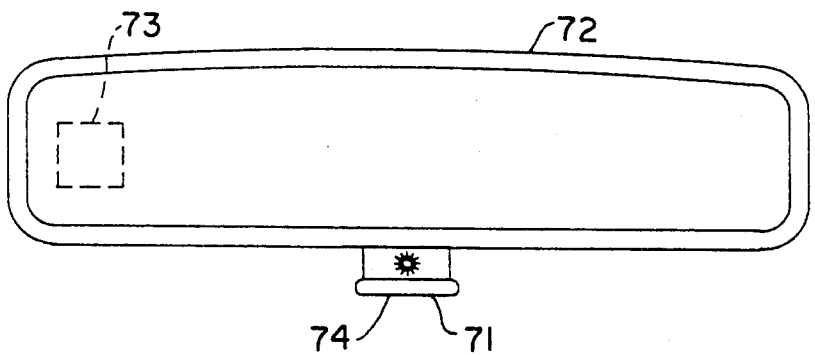
FIG. 16   FIG. 15
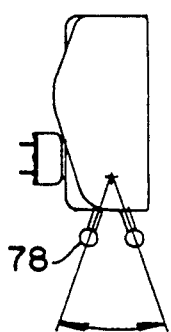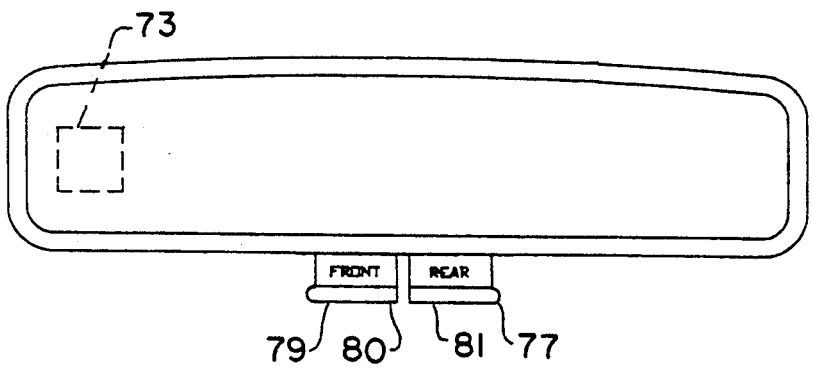
FIG. 18   FIG. 17

VEHICLE SIGNALLING SYSTEM

BACKGROUND OF THE INVENTION

This invention relates to vehicle operating systems and more particularly to a system for requesting drivers to dim or turn on their vehicle's headlights.

Glare from bright headlight beams is irritating, can affect vehicle safety, and produces driver stress. Another problem is that some drivers fail to turn on their vehicle's headlights.

Vehicle headlights have two operating modes, namely, a low beam mode which is intended to be used during normal driving conditions and a high beam mode which is intended to be used only momentarily and with discretion during special driving conditions, by way of example, when approaching curves at high speeds on highways. The bright light headlight problem arises because drivers intentionally or inadvertently fail to turn off their vehicle's bright high headlight beams. The severity of the problem has increased because manufacturers have increased the maximum illumination of headlights.

Vehicle manufacturers have attempted to solve the headlight glare problem with "day and night" rear view mirrors. Although the day/night mirrors are somewhat effective for reducing glare, they are not an acceptable solution because they reduce rear vision and are ineffective for eliminating glare from reflections off of side view mirrors on the exteriors of vehicles. Manufacturers have also made available as accessories automatic headlight dimmers which dim headlights in the presence of other lights. This also is not an acceptable solution because they are expensive and ineffective for dimming headlights of vehicles travelling behind a vehicle.

A failure to turn on headlights can result in a head-on collision or the forcing of other vehicles off the road, especially on highways, in dark winding residential neighborhoods, and during fog, dust storms, rain and snow. Some drivers attempt to request drivers of oncoming vehicles to dim their vehicle's headlights by flashing headlights "on" and "off". This also is unacceptable because the flashing headlights often detract and irritate other drivers.

In view of the above, it is apparent that an effective signalling system for requesting drivers to dim or turn on their headlights is needed and would provide benefits heretofore unavailable.

SUMMARY OF THE INVENTION

The present invention is related to my U.S. Pat. Nos. 5,113,175 and 5,119,067 my co-pending U.S. application Ser. No. 07/808,174.

One benefit of the present invention is that an operating control for a vehicle signal system is provided which is visible and accessible to a driver during nighttime darkness. Another benefit is that investment and manufacturing costs are reduced by integrating a light for signalling oncoming vehicles into an existing outside vehicle mirror. Another benefit is that the investment and manufacturing costs are further reduced by providing a pair of lights on the rear of a vehicle which function as rear signal lamps and back-up lamps. Another benefit is that the rear signalling lights can be automatically operated by the controls of an automatic dimming rear view mirror.

The invention comprises a signal light for transmitting a high intensity flashing beam to a driver of an oncoming vehicle, a pair of signal lights for transmitting a pair of alternating flashing beams to a driver of a vehicle behind the signalling vehicle, a control unit for controlling the flashing of the high intensity beams and a driver control for activating and de-activating the front and rear signal lights.

One feature of the invention is that the driver control is mounted in a day/night rear view mirror at the eye level of the driver. Another feature is that the front signal light is mounted in an outside mirror on the side of the vehicle. The signal system has two selectable operating states. In one operating state, the front and rear signal lights automatically flash for predetermined intervals of time. In the other operating state, the signal lights flash continuously until de-activated by the driver. In an alternate embodiment for vehicles with automatic dimming rear view mirrors, the rear signal lights are automatically activated and de-activated by the mirror's light sensing photocell. In another alternate embodiment, a pair of back-up lamps also function as the rear signal lights.

The foregoing features and benefits, as well as other features and benefits will become apparent from the ensuing detailed description taken in conjunction with the accompanying drawings. The best mode which is contemplated in practicing my invention is disclosed and the subject matter in which exclusive property rights are claimed is set forth in each of the numbered claims at the conclusion of the detailed description.

BRIEF DESCRIPTION OF THE DRAWINGS

FIG. 1 is a plan view of a passenger vehicle which incorporates the present invention.

FIG. 2 is a left side view of the vehicle of FIG. 1.

FIG. 3 is a rear view of the vehicle of FIG. 1.

FIG. 4 is an enlarged partial view of FIG. 1 showing a front signal light mounted in an outside mirror.

FIG. 5 is an enlarged cross-sectional view through a rear signal light taken on the line 5—5 of FIG. 3.

FIG. 6 is an enlarged cross-sectional view through an alternate embodiment of a rear signal light taken in the same manner as FIG. 5.

FIG. 7 is a front view of the alternate embodiment of the rear signal light taken in the direction of arrow B in FIG. 6.

FIG. 8 is a left side view of the vehicle with an alternate embodiment of the front signal light shown in FIG. 1.

FIG. 9 is an enlarged partial longitudinal cross-sectional view through the vehicle of FIG. 1 showing an inside day/night mirror with a signal light operating control mounted in the mirror.

FIG. 10 is an enlarged partial view of FIG. 9.

FIG. 11 is an enlarged view taken in the direction of arrow C in FIG. 9.

FIG. 13 is an enlarged view taken in the direction of arrow D of FIG. 10 of an alternate operating control.

FIG. 14 is a left side view of FIG. 13.

FIG. 15 is an enlarged view taken in the direction of arrow D of an alternate operating control for use with an automatic dimming rear view mirror.

FIG. 16 is a left side view of FIG. 15.

FIG. 17 is an enlarged view taken in the direction of arrow D of FIG. 10 showing an alternate operating control for use with an automatic dimming mirror.

FIG. 18 is a left side view of FIG. 17

DETAILED DESCRIPTION OF THE PREFERRED EMBODIMENT

Figure 12:
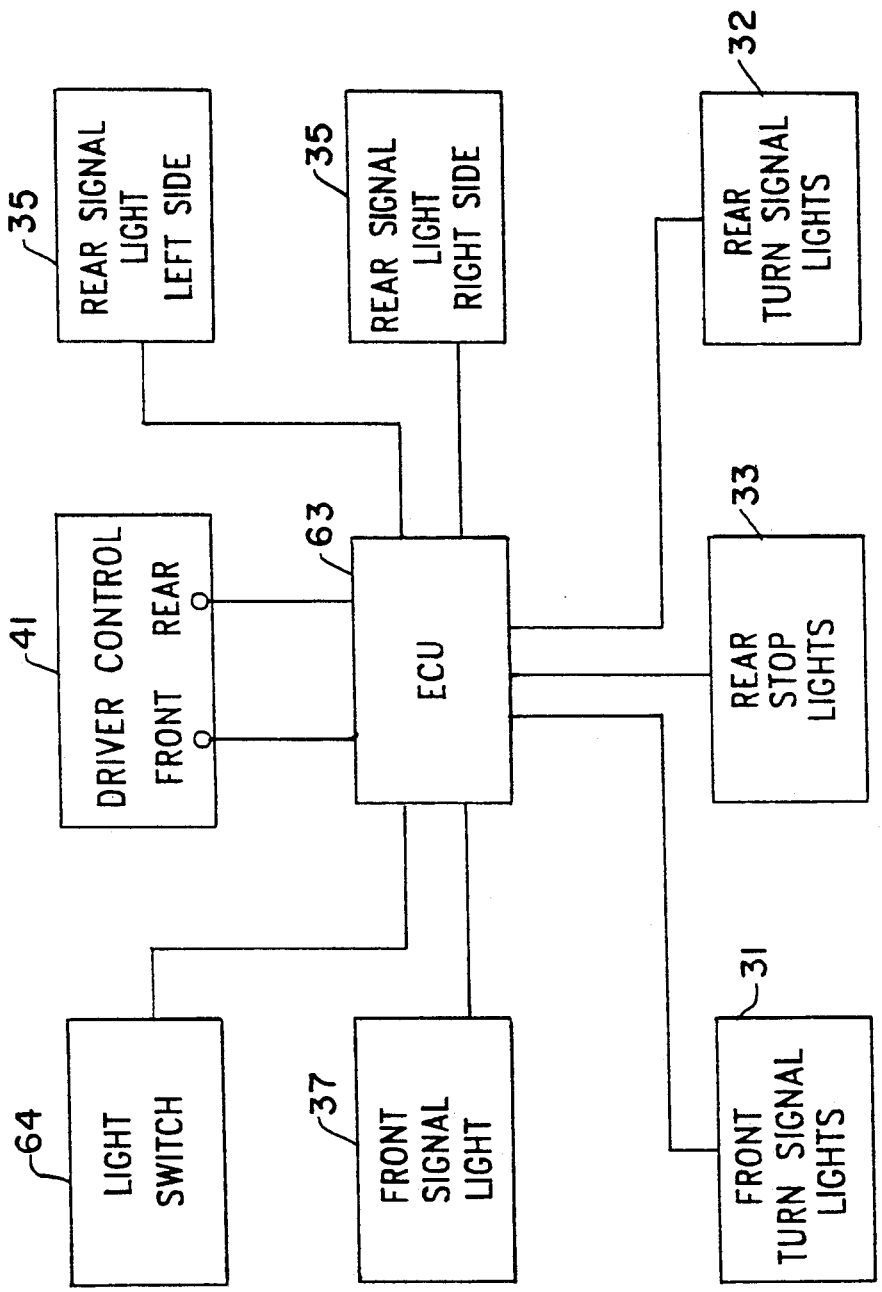
FIG. 12 is a block diagram of the vehicle signal system in the vehicle of FIG. 1.

Referring now to the drawings wherein like numerals designate like and corresponding parts throughout the several views, a typical passenger vehicle, generally designated by the numeral 30, is shown in FIGS. 1 through 3 which embodies the present invention. The vehicle 30 has conventional front turn signals 31, rear turn signals 32, stop lights 33 and tail lights 34. The rear turn signals 32 and stop lights 33 are combined whereby the same light bulbs are used for stop lights 33 and rear turn signals 32.

A pair of bright signal lights 35 are mounted at the rear of the vehicle 30 for transmitting flashing signals 36 rearwardly to request a driver of a rearward vehicle to dim or turn on his vehicle's headlights. A single signal light 37 is mounted in an outside mirror assembly 38 on the driver's door 39 for transmitting a flashing signal 40 forwardly to request a driver of an oncoming vehicle to dim or turn on his vehicle's headlights. The front 40 and rear signal lights 36 are actuated by a control 41 mounted on the vehicle's day/night rear view mirror 42.

The construction of the front signal light 37 is best understood by referring to FIGS. 1, 2 and 4. The front signal light 37 comprises a high intensity halogen light bulb 43, a light socket 44, a collimating lens 45 a bezel 46 and a plate 47 mounted in the mirror's housing 48. The halogen bulb 43 and collimating lens 45 produce a focused high intensity beam 40. The halogen bulb 43 and lens 45 are mounted in the mirror's housing 48 at about a 20 degree angle to the longitudinal axis "A" of the vehicle. The angular mounting of the halogen bulb 43 and lens 45 provide two important benefits over the current practice of flashing a vehicle's headlights. First, the signalling beam 40 is transmitted in the direction of an oncoming vehicle. Second, the beam 40 neither distracts nor irritates a driver of a vehicle directly ahead of the signalling vehicle 30.

In my co-pending application Ser. No. 07/808,174, other locations for front and rear signalling lights are disclosed which are incorporated herein by reference. Another embodiment 49 is shown in FIG. 8. A front signalling light 50 is mounted in its own housing 51 on the vehicle's windshield pillar 52 on the driver's side of the vehicle 30. This embodiment 49 permits the light 50 to be mounted higher than the previous embodiment.

The construction of the rear signal lights 35 is best understood by reference to FIGS. 3 and 5. Each of the rear signalling lights 35 comprises a high intensity halogen bulb 43, a parabolic reflector 53 and a lens 54. The rear signal lights 35 are mounted above the vehicle's rear bumper 55 in the cover 56 of the vehicle's luggage compartment. The lights 35 are centered on the vehicle 30 and when activated transmit a pair of alternate flashing beams 36 to request a driver of a vehicle to dim or turn on his vehicle's headlights. It is important to note that the rear signal lights 35 are closely spaced. This has been found to be desirable for distinguishing the lights 35 from other lights on the rear of the vehicle 30. It has also been found that a pattern of alternate flashes at a rate in excess of the turn signal flashing rate is also effective for distinguishing the rear signal lights 35. It has also been found that the high intensity of the signal beam 36 is further effective for distinguishing the rear signal lights 35.

One important feature of the present invention, which in itself is believed to be novel is that the control 41 for operating the front 37 and 35 rear signal lights is visible, accessible and easy to use. This is especially important because the signal lights 35, 37 are used during the reduced visibility and darkness of the evening and night. It is also important because for oncoming vehicles on highways closing at high speeds, the delay in operating the front lights 37 should be minimal.

With reference to FIGS. 9 through 11, the control 41 is positioned at the driver's "eye level" in a day/night rear view mirror 42. The day/light mirror 42 is adhesively held in a conventional manner to the vehicle's windshield 57. In FIGS. 9 through 11, the rotatable single lever control 41 is provided for operating the front signal light 37, rear signal lights 35, and day/night mirror 42. The operation of the multi-function control 41 is best understood by referring to FIG. 10.

A rotatable lever 58 extends downwardly out of the day/night mirror 42. The lever 58 is selectively rotatable to four positions. The two inner positions control the reflectiveness of the mirror 38. The forward inner position 59 is the day position and the rearward inner position 60 is the night position. The forward outer position 61 operates the front signal light 37 and the rearward outer position 66 operates the rear signal lights 35. The control 41 is spring biased to return the lever 58 to the inner positions 59, 60 when the lever 58 is released by the driver. Accordingly, when the lever 58 is rotated to an outer position 61, 62 and released, the lever 58 returns to the adjacent inner positions.

The signalling system has two operating states, namely, a first state wherein the signal lights 35, 37 flash at a constant rate for a predetermined interval of time and a second state where the signal lights 35, 37 flash continuously. When the control 41 is moved to the forward outer position 61 and released, the front signal light 37 will begin to operate and transmit a flashing beam 36 at a constant frequency for a predetermined interval of time. If the lever 58 is held in the forward outer position 61, the front signal light 37 will flash continuously until the lever 58 is released and allowed to return to the adjacent inner position 59. In a similar manner, when the control 41 is moved to the rearward outer position 62 and released, the rear signal lights 35 will flash continuously for a predetermined interval of time until the lever 58 is released.

Another feature of the signal system is that it will not operate if either the vehicle's turn signals 31, 32 or stop lights 33 are operating. This is important to prevent confusion among other drivers. The vehicle signal system is diagrammatically depicted in block form in FIG. 12. An electronic control unit (ECU) 63 is provided for controlling the operation of the signal lights 35, 37. The ECU 63 is preferably a modular state of the art unit comprised of relays and solid state components.

The vehicle's turn signals 31, 32 and stop lights 33 provide input signals when they are operating to prevent operation of either the front 37 or rear 35 signal lights. The control 41 which is mounted in the vehicle's rear view mirror is connected to the ECU 63. The vehicle's light switch 64 is also connected to the ECU 63 to provide electrical power to the front 37 and rear 35 signal lights.

The invention is used as follows. When the driver control lever 58 is moved to the outer forward 61 or outer rearward 62 positions, and the rear turn signals 32 and stop lights 33 are inactive, current is supplied from the ECU 63 to the rear signal lights 35. When the rear signal lights 35 begin operating, a pair of high intensity alternating flashing beams 36 are transmitted rearwardly to request a driver to dim or turn on his vehicle's headlights. If the driver control 41 is momentarily brought to an outer position 61, 62 and released, the ECU 63 will terminate flashing after a predetermined interval of time, by way of example, six seconds. The sequence can be repeated as many times as desired or the control 41 can be held in an outer position 61, 62 to cause the signalling lights 35, 37 to flash continuously.

Figure 19:
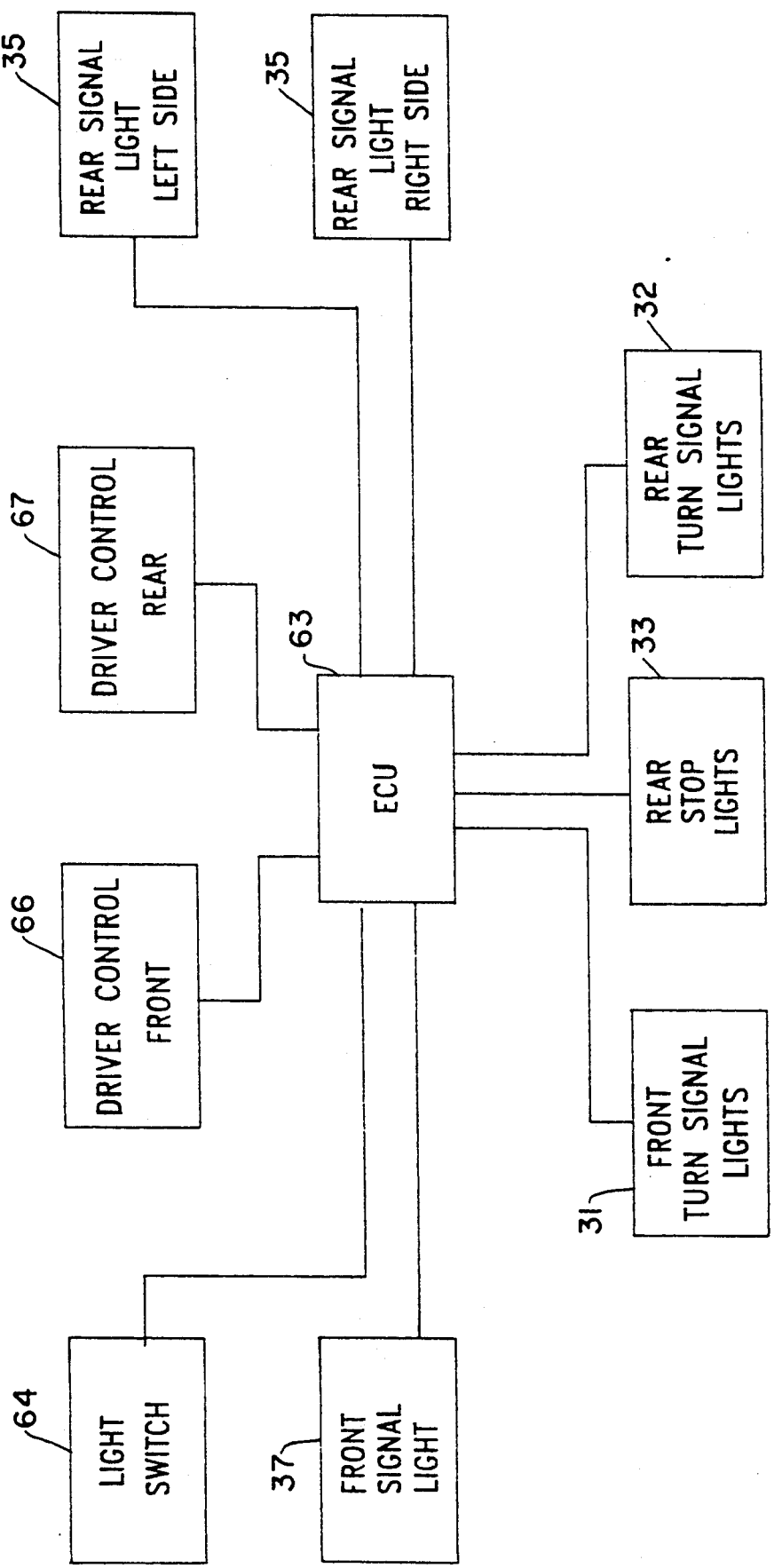
FIG. 19 is a block diagram of an alternate embodiment of the vehicle signal system of FIG. 12.

Alternate arrangements for the driver's operating control in conjunction with a rear view mirror are shown in FIGS. 13 through 18. In FIGS. 13 and 14, an arrangement of three labeled controls is depicted. In this arrangement, separate controls are provided for the mirror 65, front signal lights 66 and rear signal lights 67. The outer controls 61, 62 operate the front 37 and rear 35 signalling lights and the center control 65 operates the day/night mirror 42. Each control has a rotatable downward extending lever 68. The front 66 and rear 67 signal light controls are spring biased to return their respective levers to the rearward positions 69 when they are released by a driver. If the outer levers 66, 67 are momentarily rotated to their forward positions 70 and released, the levers 68 will return to the rearward positions 69 and the signal lights 35, 37 will flash at a constant rate for a predetermined interval of time. If the levers 68 are held in the forward position, the signal lights 35, 37 will flash continuously. One benefit of this arrangement is that both the front 37 and rear 35 signal lights can be made to flash simultaneously. A block diagram for a signal system with this control is depicted in FIG. 19. The block diagram is similar to FIG. 12, except for the separate controls 65, 66, 67.

In FIGS. 15 and 16, a single control 71 is shown for a vehicle 30 which is equipped with an automatic dimming rear view mirror 72. The mirror 72 has a light sensor 73, generally a light sensing photocell, which automatically adjusts the reflectiveness of the mirror 72 in accordance with the intensity of light rays which strike the sensor 73. A downward extending lever 74 has three positions. The center position 75 is an "off" position. The forward position is an "on" position for the front signal light 37. The control 71 is spring biased to return the downward extending lever 74 to the center position 75 if the lever 74 is released.

Figure 20:
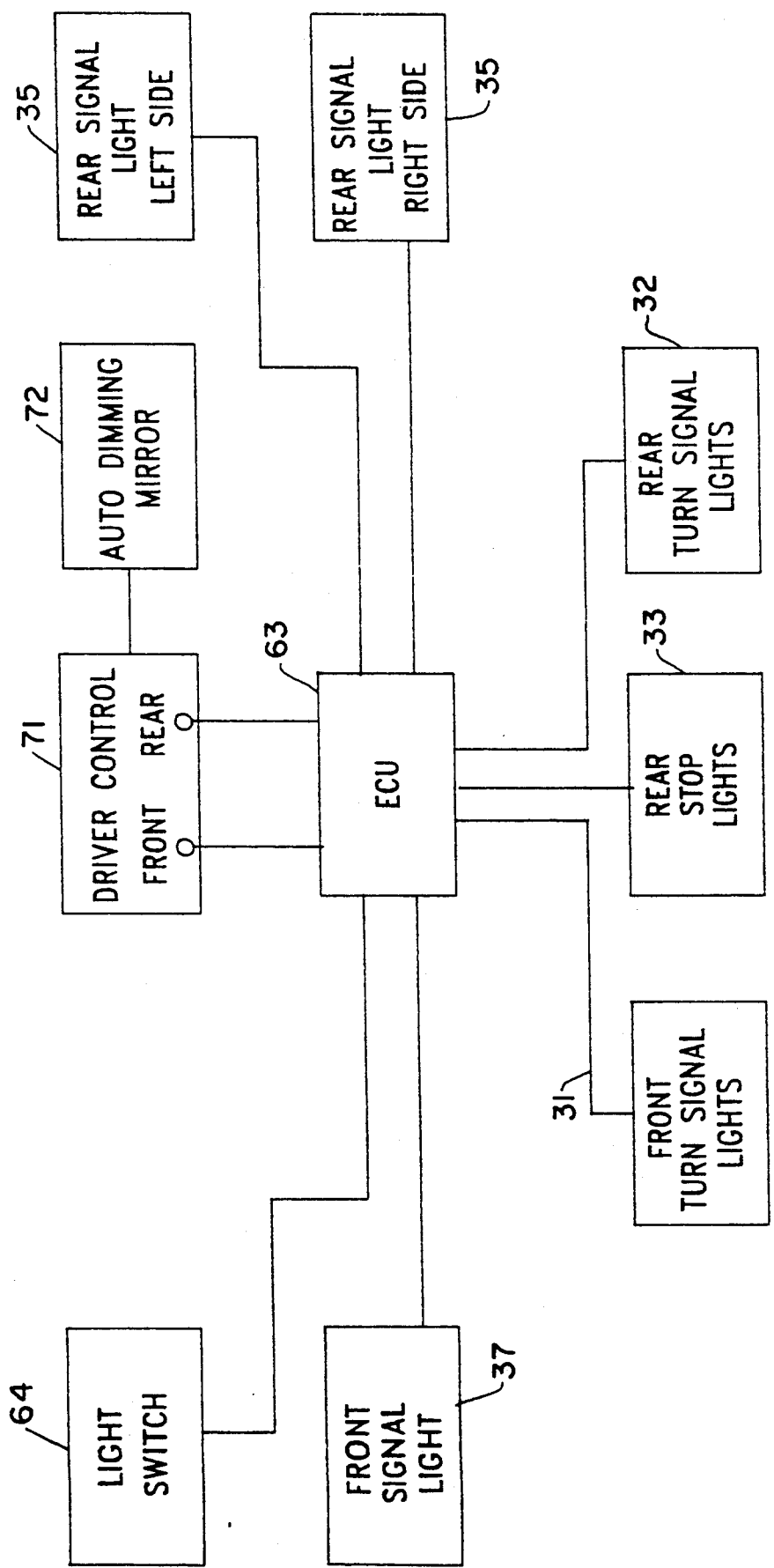
FIG. 20 is a block diagram of a vehicle signal with an automatic dimming rear view mirror and the control of FIGS. 15 and 16.

The rearward position 76 is an "on" position for the automatic operation of the rear signal lights 35. When the reflectiveness of the mirror 72 is reduced a predetermined amount by an increase in the intensity of light rays striking the light sensor 73, the rear signalling lights 35 are automatically activated by the ECU 63 and begin transmitting a pair of alternating flashing beams 36 rearwardly. When the intensity of light rays falls below a predetermined threshhold, the reflectiveness of the mirror 72 automatically increases and the rear signal lights 35 are automatically turned off. It should be noted that in this arrangement, the driver control 71 functions as an "on" and "off" switch for the rear signal lights 35 and that in the "on" position the rear signal lights 35 will not be operative unless a signal of a predetermined level is received from the automatic dimming mirror 72 and not become inoperative until a signal of a second predetermined level is received from the automatic dimming mirror 72. A block diagram for a signal system with this control 71 is depicted in FIG. 20.

Figure 21:
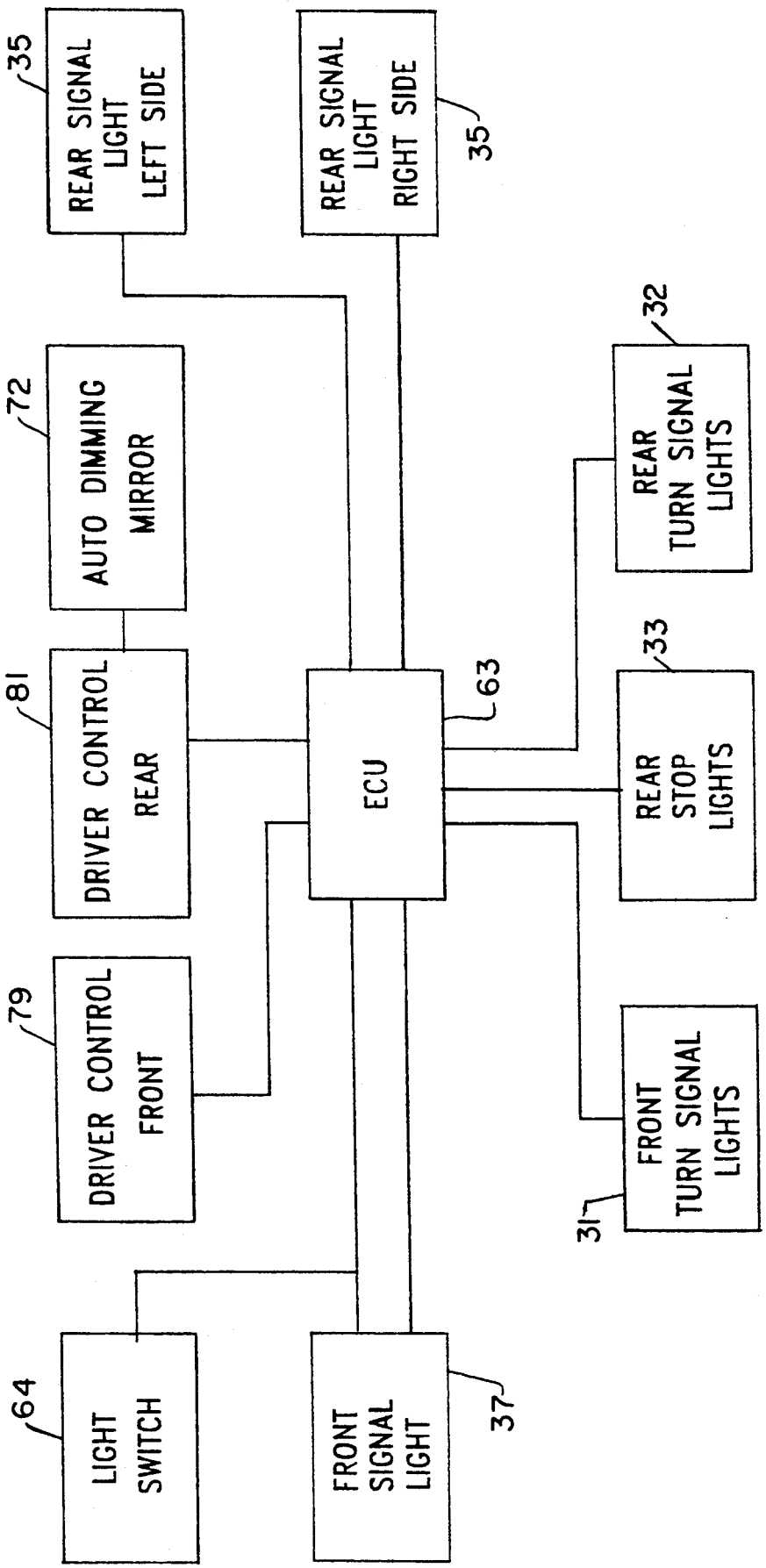
FIG. 21 is a block diagram of a vehicle signal with an automatic dimming rear view mirror and the control of FIGS. 17 and 18.
Figure 22:
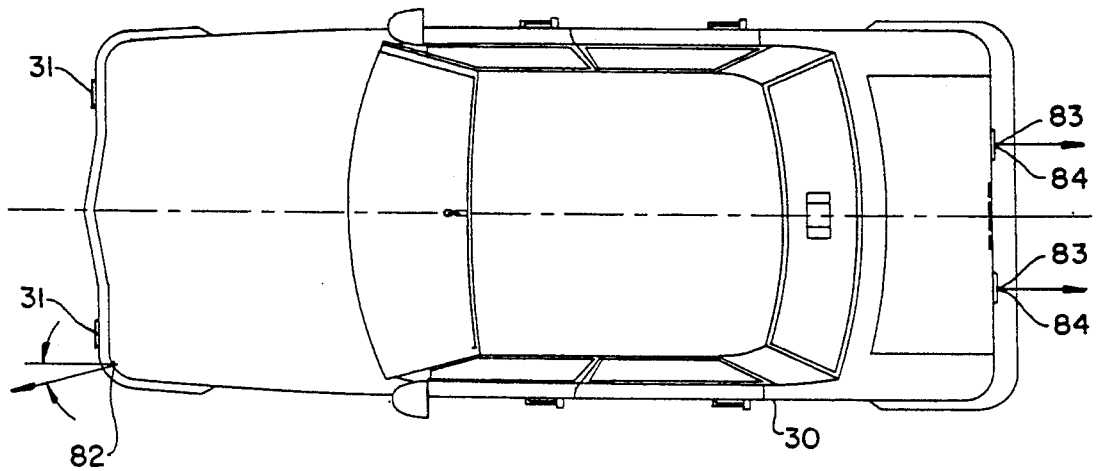
FIG. 22 is a plan view of a passenger vehicle with a front signal light in the vehicle's left front corner and combined rear signal lights and back-up lights.
Figure 23:
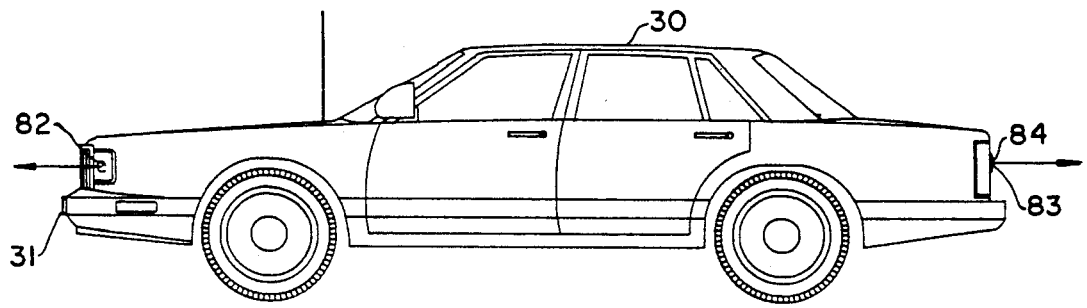
FIG. 23 is a left side view of the passenger vehicle of FIG. 22.
Figure 25:
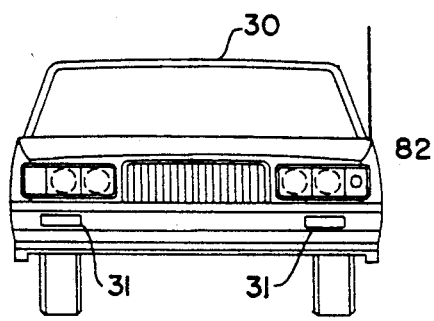
FIG. 25 is a rear view of the passenger vehicle of FIG. 22.
Figure 24:
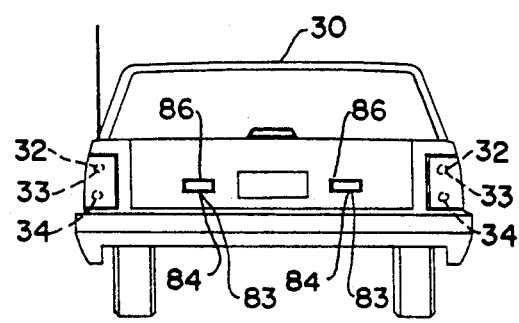
FIG. 24 is a front view of the passenger vehicle of FIG. 22.

In FIGS. 17 and 18 a dual control 77 is illustrated for a vehicle with an automatic dimming rear view mirror 72 and the present invention. The operation of the dual control 77 is similar to the single control 71 of FIGS. 15 and 16. The forward position 78 of the front signal light control 79 is an "on" position. The front light control 79 is spring biased to return the lever 80 to the "off" position. When the front signal light control 79 is momentarily moved to the forward position and released, the front signal light 37 will flash for a predetermined time and stop. If held in the forward position, the front signal light 35 will continue to flash until the lever 80 is released. The rear signal light control 81 is an "on"/"off" control and will not activate the rear signal lights unless a signal of a predetermined level is received from the automatic dimming mirror 72 whereby the rear signal lights 35 will be automatically activated. The rear signal lights 35 will automatically turn off when the signal from the automatic dimming mirror 72 is at a second predetermined level. A block diagram for a signal system with this control 77 is depicted in FIG. 21.

Referring now to FIGS. 22 through 25, the vehicle 30 is shown with alternate embodiments of front 82 and rear 83 signal lights. The front signal light 82 is located in the left front corner of the vehicle 30. This location was previously disclosed in my co-pending application Ser. No. 07/808,174 and is incorporated herein by reference. The rear signalling lights 83 are combined with the vehicle's back-up lights by providing a common high intensity bulb and common optics. The construction of the rear signal lights 83 is the same as previously described for the first embodiment. The back-up lamp function is achieved by retaining a carryover back-up lamp switch (not shown) which causes the light 83 to illuminate without flashing when the vehicle 30 is in reverse. A ballast resistor (not shown) or other voltage dropping means may be provided to reduce the intensity of the light 86 in the back-up lamp mode. Priority for the back-up lamp operation is assured by supplying a signal to the ECU 63 when the back-up light switch 85 is closed to block the rear signal light 35 mode. A block diagram for this signal system is depicted in FIG. 26.

Figure 26:
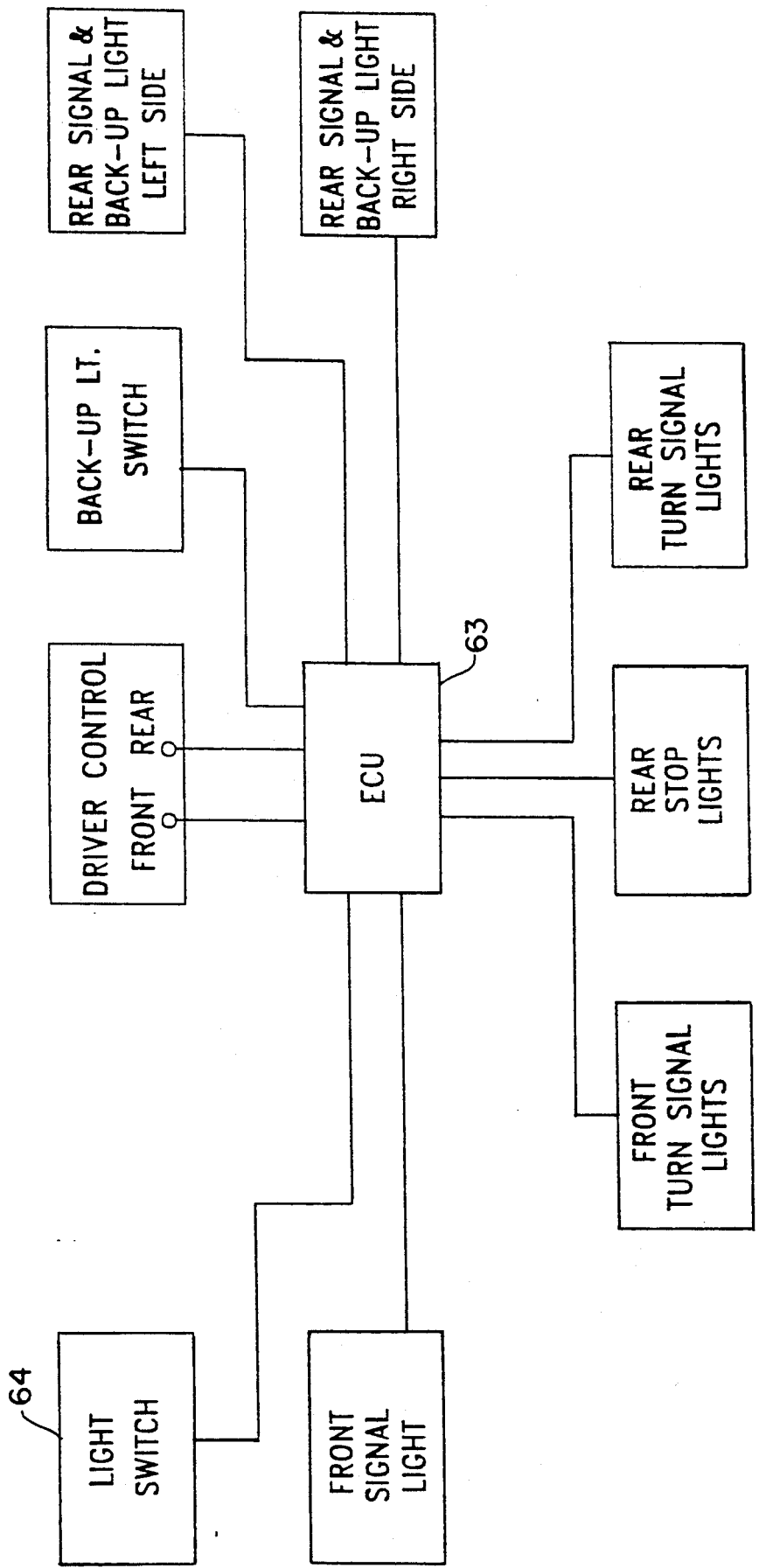
FIG. 26 is a block diagram of a vehicle signal with an automatic dimming rear view mirror and the control of FIG. 24.

The block diagram in FIG. 26 is similar to FIG. 9, except that the back-up lamp switch 85 is in series with the ECU 63. If the back-up lamp switch 85 is closed, non-flashing illumination is produced and the rear signal lights 35 cannot be activated. If the back-up lights 86 are not active, a closing of a driver control 41 Will cause the lights to transmit a pair of flashing beams.

It should be understood that although I have illustrated and described embodiments of my signalling lights which I believe to be desirable, it is not my intention to limit my invention exactly to these embodiments since the appearance and exact locations of the lights will be decided by the management, stylists and marketing specialists of the automobile manufacturers.

Moreover, it will be appreciated that other embodiments can be derived by obvious changes without departing from the spirit thereof.

I claim:

1. A vehicle signal system for alerting a driver to dim his vehicle's bright headlights, comprising: at least one signal light mounted on a first vehicle for transmitting a flashing light beam to a driver operating a second vehicle; an electrical circuit for controlling the operation of said signalling light; an inside day/night rear view mirror mounted inside of said first vehicle, said mirror being located near the eye level of the driver of said first vehicle and selectively switchable between day and night positions; and a single multi-function control mounted in said day/night mirror for turning said signalling light "on" and "off" and for switching said inside day/night mirror between day and night positions.

2. The vehicle signal system recited in claim 1 wherein said signal light is mounted on the rear of said first vehicle, said signal light transmits said flashing light beam rearwardly, and said second vehicle is behind said first vehicle.

3. The vehicle signal system recited in claim 2 further comprising said signal light on the rear of said vehicle being a first signal light; and a second signal light mounted on the rear of said first vehicle for transmitting a pair of flashing beams rearwardly to said driver operating said second vehicle.

4. The vehicle signal system recited in claim 3 wherein said first and said second signal lights alternately flash "on" and "off".

5. The vehicle signal system recited in claim 3, said first and said second signal lights mounted on the rear of said vehicle being adapted to also serve as back-up lights for said first vehicle.

6. The vehicle signal system recited in claim 1 wherein said signal light transmits said flashing light beam forwardly and said second vehicle is an oncoming vehicle ahead of said first vehicle.

7. The vehicle signal system recited in claim 6 wherein said signal light is transmitted forwardly and outwardly from said first vehicle.

8. The vehicle signal system recited in claim 7 wherein said signal light is mounted on the front of said first vehicle.

9. The vehicle signal system recited in claim 7 wherein said signal light is mounted on a windshield pillar of said first vehicle.

10. The vehicle signal system recited in claim 7 wherein said signal light is mounted on the side of said first vehicle.

11. The vehicle signal system recited in claim 10 further comprising an outside mirror mounted on the side of said vehicle and said signal light on said side of said vehicle being mounted in a forward portion of said mirror.

12. The vehicle signal system recited in claim 1 wherein said signal light comprises a high intensity light and a collimating lens for transmitting a narrow high intensity beam to said driver of said second vehicle.

13. The vehicle signal system recited in claim 1 wherein said signal light has two operating states, a first state wherein said signal light automatically flashes "on" and "off" at a constant rate for a predetermined amount of time and a second state wherein said signal light can be made to flash "on" and "off" continuously for any amount of time.

14. The vehicle signal system recited in claim 1 further comprising a light sensing photocell for automatically turning said signalling light "on" and "off".

15. The vehicle signal system recited in claim 1 wherein said day/night mirror is an automatic dimming mirror and said single multi-function control mounted in said day/night mirror for turning said signalling light "on" and "off" and for switching said inside day/night mirror between day and night positions includes a light sensing photocell for dimming said mirror.

16. In a first vehicle having a pair of front turn lights, a pair of rear turn signal lights, a pair of rear stop lights, an inside day/night rear view mirror mounted on a windshield of said first vehicle and selectively switchable between day and night positions, and an outside mirror mounted on the side of said first vehicle, the improvement comprising: a pair of signal lights mounted on the rear of said first vehicle for transmitting a pair of alternating flashing light beams to a driver operating a second vehicle behind said first vehicle to request said driver of said second vehicle to dim or turn on his vehicle's headlights; an electronic control unit for controlling the flashing of said signal lights; and a single multi-function control mounted in said inside day/night mirror for turning said flashing signal lights "on" and "off" to request said driver of said second vehicle to dim or turn on his vehicle's headlights and for switching said inside day/night mirror between day and night positions.

17. The improvement recited in claim 16 wherein said pair of signal lights are operative only when said rear turn signal lights and said rear stop lights are inoperative.

18. The improvement recited in claim 16 further comprising a third signal light mounted in a front portion of said outside mirror for transmitting a flashing light beam to a driver of an oncoming third vehicle.

19. The improvement recited in claim 18 wherein said third signal light is operative only when said front turn signal lights are inoperative.

20. In a first vehicle having a pair of front turn lights, a pair of rear turn signal lights, a pair of rear stop lights, an inside day/night rear view mirror mounted on a windshield of said first vehicle, and an outside mirror mounted on the side of said first vehicle, the improvement comprising: a pair of signal lights mounted on the rear of said first vehicle for transmitting a pair of alternating flashing light beams to a driver operating a second vehicle behind said first vehicle; a third signal light mounted in a front portion of said outside mirror for transmitting a flashing light beam to a driver of an oncoming third vehicle; an electronic control unit for controlling the flashing of said signal lights; and a single multi-function control mounted in said inside day/night mirror for turning said flashing signal lights "on" and "off" and for switching said inside day/night mirror between day and night positions.

* * * * *